(12) United States Patent
Weitzel et al.

(10) Patent No.: US 7,863,370 B2
(45) Date of Patent: Jan. 4, 2011

(54) DISPERSION POWDERS STABILIZED BY POLYVINYL ALCOHOL PROTECTIVE COLLOIDS

(75) Inventors: Hans-Peter Weitzel, Reischach (DE); Werner Bauer, Burgkirchen (DE)

(73) Assignee: Wacker Chemie AG, Munich (DE)

( * ) Notice: Subject to any disclaimer, the term of this patent is extended or adjusted under 35 U.S.C. 154(b) by 675 days.

(21) Appl. No.: 11/600,952

(22) Filed: Nov. 16, 2006

(65) Prior Publication Data

US 2007/0112128 A1    May 17, 2007

(30) Foreign Application Priority Data

Nov. 17, 2005  (DE) ................. 10 2005 054 905

(51) Int. Cl.
  C08J 3/12      (2006.01)
  C08F 218/04    (2006.01)
  C08L 29/04     (2006.01)
  C08L 31/04     (2006.01)
(52) U.S. Cl. .................. 524/458; 526/202; 524/524
(58) Field of Classification Search ............... 524/524, 524/458; 526/202
  See application file for complete search history.

(56) References Cited

U.S. PATENT DOCUMENTS 5,118,751 A * 6/1992 Schulze et al. ............. 524/503
5,498,665 A * 3/1996 Schulze et al. ............. 525/57
5,567,750 A * 10/1996 Schulze et al. ............. 524/3
6,527,448 B1   3/2003 Gurka et al.

FOREIGN PATENT DOCUMENTS

| CN | 1103876 C | 3/2003 |
| DE | 101 62 513 A1 | 7/2003 |
| EP | 0 477 900 A2 | 4/1992 |
| EP | 0 632 096 A1 | 1/1995 |
| EP | 1 262 465 B1 | 10/2003 |
| JP | 06-087640 | 3/1994 |
| WO | 2004/092094 A1 | 10/2004 |

OTHER PUBLICATIONS

J. Wiley & Sons, Polymer Handbook, 2nd Edition, New York (1975), Chapter 6.
English PatBase Abstract (1 page) corresponding to WO 2004/092094 A1, published Oct. 28, 2004 (previously submitted).
English Abstract (1 page) corresponding to DE 102 62 513 A1, published Jul. 17, 2003 (previously submitted).
English Abstract (1 page) corresponding to EP 1 262 465 B1, published Oct. 15, 2003 (previously submitted).
Fox, T.G., "Influence of Diluent and Copolymer Composition on the Glass Temperature of a Polymer System", Bull. Am. Physics Soc. 1, 3, (1956), p. 123.

* cited by examiner

*Primary Examiner*—Kelechi C Egwim
(74) *Attorney, Agent, or Firm*—Brooks Kushman P.C.

(57) ABSTRACT

Dispersion powders stabilized include a protective colloid. The protective colloid includes at least one polyvinyl alcohol having a Höppler viscosity $\mu_1$ of not more than 3 mPas and at least one polyvinyl alcohol having a Höppler viscosity $\mu_2$ of from 4 mPas to 25 mPas. The weighted Höppler viscosity $\mu_w$ of the protective colloid is not more than 6 mPas.

14 Claims, No Drawings

DISPERSION POWDERS STABILIZED BY POLYVINYL ALCOHOL PROTECTIVE COLLOIDS

BACKGROUND OF THE INVENTION

1. Field of the Invention

The invention relates to water-redispersible dispersion powders that are stabilized by protective colloids and contain polyvinyl alcohol having a Höppler viscosity of not more than 3 mPas, their preparation and their use in hydraulically setting systems.

2. Background Art

Polymers based on vinyl esters, vinyl chloride, (meth) acrylate monomers, styrene, butadiene and ethylene are used first and foremost in the form of their aqueous dispersions or water-redispersible polymer powders in many applications. For example such polymers are used as coatings or adhesives for a wide variety of substrates. These polymers are stabilized using protective colloids or more rarely low molecular weight surface-active compounds. Polyvinyl alcohols are generally used as protective colloids.

Polyvinyl alcohol has many advantages as a protective colloid. In particular, polyvinyl alcohol makes powder stable against premature coalescence of the particles while acting as binder. However, polyvinyl alcohol is sometimes disadvantageous when large amounts of dispersion powder are used (e.g., in sealing slurries). In this case, the newtonian rheology of the polyvinyl alcohol is a disadvantage in the processing of these compositions.

The polyvinyl alcohols used according to the prior art generally have a Höppler viscosity (in accordance with DIN 53015: 1978-09) of at least 3 mPas. In other prior art variations, the polyvinyl alcohols have a Höppler viscosity of at least 4 mPas, as described, for example, in patent documents DE 10162513 A1 and EP 1 262 465 B1. Although there is no upward limit on the Höppler viscosity, values above 30 mPas are seldom employed due to the increasing viscosity.

Values of the Höppler viscosity below 3 mPas have not been studied very well because of the assumption that such low molecular weight compounds are not very suitable for stabilizing dispersion powders.

Dispersion powders are prepared, for example, by spray drying, as described in EP 1 262 465 B1, or by freeze drying of aqueous lattices.

The products set forth above are used, in particular, as binders in hydraulically setting adhesives. For example, these products are used in tile adhesives based on cements or gypsum plaster.

SUMMARY OF THE INVENTION

It is therefore an object of the invention to develop a dispersion powder which displays good processing even when used in large quantities. This object is achieved by the dispersion powders of the invention that contain a mixture of low-viscosity and relatively high-viscosity polyvinyl alcohols to stabilize them.

An embodiment of the invention provides dispersion powders stabilized by protective colloids. The dispersion powders include a base polymer and the protective colloids. The protective colloid comprises:

a) at least one polyvinyl alcohol having a Höppler viscosity $\mu_1$ of not more than 3 mPas and b) at least one polyvinyl alcohol having a Höppler viscosity $\mu_2$ of from 4 mPas to 25 mPas.

Moreover, the weighted Höppler viscosity $\mu_w$ of the protective colloid is not more than 6 mPas.

Surprisingly, despite the high proportion of extremely low molecular weight polyvinyl alcohols, dispersion powders that provide blocking-stable powders are obtained. It has also surprisingly been found that the low molecular weight polyvinyl alcohol not only has a positive effect on the processing, but also improved adhesion to polymers such as polystyrene.

DETAILED DESCRIPTION OF THE PREFERRED EMBODIMENT(S)

In an embodiment of the invention, a dispersion powder stabilized by protective colloids is provided. The dispersion powders include a base polymer and the protective colloids. The protective colloid comprises:

a) at least one polyvinyl alcohol having a Höppler viscosity $\mu_1$ of not more than 3 mPas; and b) at least one polyvinyl alcohol having a Höppler viscosity $\mu_2$ of from 4 mPas to 25 mPas Moreover, the weighted Höppler viscosity $\mu_w$ of the protective colloid is not more than 6 mPas.

The powders of the present embodiment contain from 0.1 to 10.0% by weight of a polyvinyl alcohol a) having a Höppler viscosity of not more than 3 mPas. Preferably, the powders of the present embodiment contain from 1.0 to 5.0% by weight of this polyvinyl alcohol a). The Höppler viscosity $\mu_1$ is preferably in the range from 1.5 mPas to 2.5 mPas.

The polyvinyl alcohol comprising a) and b) is preferably added to the dispersion prior to drying to form the powder. However, the polyvinyl alcohol can also be added during the polymerization of the starting dispersion.

The low molecular weight polyvinyl alcohol a) is used in combination with a standard relatively high molecular weight polyvinyl alcohol b). However, in order to prevent partial loss of the positive effects, the proportion of high molecular weight material should not be too high. Preferably, from 10 to 50% by weight of relatively high molecular weight polyvinyl alcohol b), based on the total amount of polyvinyl alcohol is used. More preferably, from 15 to 35% by weight of b), based on the total amount of polyvinyl alcohol is used.

To obtain the positive effect, the following prerequisites have to be met. To function as a protective colloid, a combination of at least one polyvinyl alcohol a) having a Höppler viscosity $\mu_1$ of not more than 3 mPas and at least one polyvinyl alcohol b) having a Höppler viscosity $\mu_2$ of from 4 mPas to 25 mPas is used. In this variation, the ratio of a) to b) is selected so that the weighted Höppler viscosity $\mu_w$ is not more than 6 mPas. The Höppler viscosity $\mu_w$ can be described by the general equation (1)

$$\mu_w = \mu_1 * x_1 + \mu_2 * x_2 + \ldots \mu_i * x_i \quad (1)$$

where i=the number of polyvinyl alcohols a) and b) used, i.e., at least 2, $x_i$=the mass fraction of the respective polyvinyl alcohol i having the Höppler viscosity $\mu_i$ and can be described by the general equation (2)

$$x_i = w_i/(w_1 + w_2 + \ldots w_i) \quad (2),$$

where w=the respective mass of the polyvinyl alcohol and i has the above meaning.

In variations of the invention, the dispersion powder stabilized by a protective colloid correspond optionally further includes constituents known in the prior art.

Suitable vinyl esters for the base polymer include carboxylic acids having from 1 to 15 carbon atoms. More preferably, suitable vinyl esters include vinyl acetate, vinyl propionate, vinyl butyrate, vinyl 2-ethylhexanoate, vinyl laurate, 1-methylvinyl acetate, vinyl pivalate, and vinyl esters of α-branched monocarboxylic acids having from 9 to 13 carbon atoms. Examples of such vinyl esters include VeoVa9R or VeoVa10R (trade names of Resolution Europe BV, Hoogvliet, The Netherlands). Most preferably, the vinyl ester is vinyl acetate.

Suitable methacrylic esters or acrylic esters include esters of unbranched or branched alcohols having from 1 to 15 carbon atoms, e.g., methyl acrylate, methyl methacrylate, ethyl acrylate, ethyl methacrylate, propyl acrylate, propyl methacrylate, n-butyl acrylate, n-butyl methacrylate, 2-ethylhexyl acrylate, norbornyl acrylate. More preferably, suitable methacrylic esters or acrylic esters include methyl acrylate, methyl methacrylate, n-butyl acrylate and 2-ethylhexyl acrylate.

Examples of olefins and dienes include ethylene, propylene and 1,3-butadiene. Suitable vinylaromatics include styrene and vinyltoluene. A suitable vinyl halide is vinyl chloride.

In a variation of the present embodiment, auxiliary monomers in an amount from 0.05 to 50% by weight, preferably from 1 to 10% by weight, based on the total weight of the base polymer, can additionally be copolymerized. More preferably, auxiliary monomers in an amount from 1 to 10% by weight, based on the total weight of the base polymer, can additionally be copolymerized. Examples of auxiliary monomers include ethylenically unsaturated monocarboxylic and dicarboxylic acids (e.g. acrylic acid, methacrylic acid, fumaric acid and maleic acid); ethylenically unsaturated carboxamides and nitriles (e.g., acrylamide and acrylonitrile); monoesters and diesters of fumaric acid and maleic acid (e.g., the diethyl and diisopropyl esters); maleic anhydride; and ethylenically unsaturated sulfonic acids and salts thereof (e.g., vinylsulfonic acid, 2-acrylamido-2-methylpropanesulfonic acid). Additional examples include pre-crosslinking comonomers such as multiple ethylenically unsaturated comonomers (e.g., for example divinyl adipate, diallyl maleate, allyl methacrylate or triallyl cyanurate), or postcrosslinking comonomers (e.g., acrylamidoglycolic acid (AGA), methyl methacrylamidoglycolate (MAGME), N-methylolacrylamide (NMA), N-methylolmethacrylamide (NMMA), allyl N-methylolcarbamate), and alkyl ethers such as the isobutoxy ether or esters of N-methylolacrylamide, of N-methylolmethacrylamide and of allyl N-methylolcarbamate. Also suitable are epoxide-functional comonomers such as glycidyl methacrylate and glycidyl acrylate. Further examples include silicon-functional comonomers such as acryloxypropyltri(alkoxy)silanes and methacryloxypropyltri(alkoxy)silanes, vinyltrialkoxysilanes and vinylmethyldialkoxysilanes. Alkoxy groups such as methoxy, ethoxy and ethoxypropylene glycol ether radicals may be present in this latter example. Finally, monomers having hydroxy or CO groups e.g., hydroxyalkyl methacrylates and acrylates such as hydroxyethyl, hydroxypropyl or hydroxybutyl acrylate or methacrylate and also compounds such as diacetoneacrylamide and acetylacetoxyethyl acrylate or methacrylate) are also useful in variations of the present embodiment.

Examples of suitable homopolymers and copolymers include vinyl acetate homopolymers, copolymers of vinyl acetate with ethylene, copolymers of vinyl acetate with ethylene and one or more further vinyl esters, copolymers of vinyl acetate with ethylene and acrylic esters, copolymers of vinyl acetate with ethylene and vinyl chloride, styrene-acrylic ester copolymers, and styrene-1,3-butadiene copolymers.

Preferably, the homopolymers and copolymers include vinyl acetate homopolymers; copolymers of vinyl acetate with from 1 to 40% by weight of ethylene; copolymers of vinyl acetate with from 1 to 40% by weight of ethylene and from 1 to 50% by weight of one or more further comonomers from the group consisting of vinyl esters having from 1 to 12 carbon atoms in the carboxylic acid radical (e.g., vinyl propionate, vinyl laurate)vinyl esters of alpha-branched carboxylic acids having from 9 to 13 carbon atoms (e.g., VeoVa9, VeoVa10, VeoVa11), copolymers of vinyl acetate, from 1 to 40% by weight of ethylene and preferably from 1 to 60% by weight of acrylic esters of unbranched or branched alcohols having from 1 to 15 carbon atoms(e.g., n-butyl acrylate or 2-ethylhexyl acrylate); and copolymers which comprise from 30 to 75% by weight of vinyl acetate, from 1 to 30% by weight of vinyl laurate or vinyl esters of an alpha-branched carboxylic acid having from 9 to 11 carbon atoms and also from 1 to 30% by weight of acrylic esters of unbranched or branched alcohols having from 1 to 15 carbon atoms (e.g., n-butyl acrylate or 2-ethylhexyl acrylate), and further comprise from 1 to 40% by weight of ethylene; copolymers comprising vinyl acetate, from 1 to 40% by weight of ethylene and from 1 to 60% by weight of vinyl chloride. In variations of the present variation, the polymers further comprise the auxiliary monomers in the amounts set forth above such that the total weight percent adds up to 100%.

The homopolymers and copolymers also may preferably include (meth)acrylic ester polymers such as copolymers of n-butyl acrylate or 2-ethylhexyl acrylate; copolymers of methyl methacrylate with n-butyl acrylate and/or 2-ethylhexyl acrylate and, if desired, ethylene; styrene-acrylic ester copolymers comprising one or more monomers from the group consisting of methyl acrylate, ethyl acrylate, propyl acrylate, n-butyl acrylate, 2-ethylhexyl acrylate; and vinyl acetate-acrylic ester copolymers comprising one or more monomers from the group consisting of methyl acrylate, ethyl acrylate, propyl acrylate, n-butyl acrylate, 2-ethylhexyl acrylate and, if desired, ethylene; styrene-1,3-butadiene copolymers. In variations of the present variation, the polymers further comprise the auxiliary monomers in the amounts set forth above such that the total weight percent adds up to 100%

The monomer and the proportions by weight of comonomers are here chosen so that a glass transition temperature Tg of from −50° C. to +50° C., preferably from −30° C. to +40° C., generally results. The glass transition temperature Tg of the polymers can be determined in a known manner by means of differential scanning calorimetry ("DSC"). The Tg can also be approximately calculated by means of the Fox equation. According to Fox T. G., Bull. Am. Physics Soc. 1, 3, page 123 (1956): $1/Tg = x1/Tg1 + x2/Tg2 + \ldots + xn/Tgn$ (the entire disclosure of this publication is hereby incorporated by reference), where xn is the mass fraction in % by weight/100 of the monomer n and Tgn is the glass transition temperature in kelvin of the homopolymer of the monomer n. Tg values for homopolymers are listed in Polymer Handbook 2nd Edition, J. Wiley & Sons, New York (1975).

The homopolymers and copolymers are prepared by the emulsion polymerization process, with the initial polymerization temperature generally, but not necessarily, being no more than 100° C. At least 60% of the total conversion of the polymerization occurs at temperatures of from 100° C. to 140° C. Preferably, at least 70% of the total conversion of the polymerization occurs at temperatures of from 100° C. to 140° C. More preferably, at least 80% of the total conversion of the polymerization occurs at temperatures of from 100° C. to 140° C.

The polymerization is initiated using the water-soluble initiators or redox initiator combinations customary for emulsion polymerization. Examples of water-soluble initiators include the sodium, potassium and ammonium salts of peroxodisulfuric acid, hydrogen peroxide, tert-butyl peroxide, tert-butyl hydroperoxide, potassium peroxodiphosphate, tert-butyl peroxopivalate, cumene hydroperoxide, isopropylbenzene monohydroperoxide, azobisisobutyronitrile. These initiators are generally used in an amount of 0.001 to 0.02% by weight based on the total weight of the monomers. More preferably, these initiators are used in an amount from 0.001 to 0.01% by weight based on the total weight of the monomers.

Useful redox initiators include combinations of the initiators set forth above in combination with reducing agents. Suitable reducing agents include the sulfites and bisulfites of the alkali metals and of ammonium, for example sodium sulfite, derivatives of sulfoxylic acid (e.g., zinc formaldehydesulfoxylates), or alkali metal formaldehydesulfoxylates (e.g., sodium hydroxymethanesulfinate), and ascorbic acid. The amount of reducing agent is generally from 0.001 to 0.03% by weight based on the total weight of the monomers. Preferably, the amount of reducing agent is from 0.001 to 0.015% by weight based on the total weight of the monomers.

The molecular weight may be controlled by using regulating substances during the polymerization. If regulators are used, they are usually metered in with amounts of from 0.01 to 5.0% by weight, based on the monomers to be polymerized, either separately or else premixed with reaction components. Examples of such substances include n-dodecyl mercaptan, tert-dodecyl mercaptan, mercaptopropionic acid, methyl mercaptopropionate, isopropanol and acetaldehyde.

The polymerization mixture may be stabilized by adding the inventive mixture of polyvinyl alcohols a) and b). However, the polymerization can also be carried out in the presence of other protective colloids. Suitable other protective colloids for the polymerization mixture include polyvinyl alcohols; polyvinyl acetals; polyvinylpyrrolidones; polysaccharides in water-soluble form (e.g., starches such as amylose and amylopectin, celluloses and their carboxymethyl, methyl, hydroxyethyl, hydroxypropyl derivatives); proteins (e.g., casein or caseinate, soy protein, and gelatin); ligninsulfonates; synthetic polymers (e.g., poly(meth)acrylic acid, copolymers of (meth)acrylates with carboxyl-functional comonomer units, poly(meth)acrylamide, polyvinylsulfonic acids and their water-soluble copolymers); and melamine-formaldehyde sulfonates, naphthalene-formaldehyde sulfonates, styrene-maleic acid and vinyl ether-maleic acid copolymers.

Preferably, the other protective colloids include partially hydrolyzed or fully hydrolyzed polyvinyl alcohols having a degree of hydrolysis of from 80 to 100 mol %, in particular partially hydrolyzed polyvinyl alcohols having a degree of hydrolysis of from 80 to 95 mol % and a Höppler viscosity in 4% strength aqueous solution of from 1 to 30 mPas (Höppler method at 20° C.). Preference is also given to partially hydrolyzed, hydrophobically modified polyvinyl alcohols having a degree of hydrolysis of from 80 to 95 mol % and a Höppler viscosity in 4% strength aqueous solution of from 1 to 30 mPas. Examples of such alcohols include partially hydrolyzed copolymers of vinyl acetate with hydrophobic comonomers such as isopropenyl acetate, vinyl pivalate, vinyl ethylhexanoate, vinyl esters of saturated alpha-branched monocarboxylic acids having 5 or from 9 to 11 carbon atoms, dialkyl maleates and dialkyl fumarates (e.g., diisopropyl maleate and diisopropyl fumarate), vinyl chloride, vinyl alkyl ethers such as vinyl butyl ether, and olefins such as ethene and decene. The proportion of hydrophobic units is preferably from 0.1 to 10% by weight, based on the total weight of the partially hydrolyzed polyvinyl alcohol. It is also possible to use mixtures of the polyvinyl alcohols set forth above. Most preferably, the polyvinyl alcohols have a degree of hydrolysis of from 85 to 94 mol % and a Höppler viscosity in 4% strength aqueous solution of from 3 to 15 mPas (Höppler method at 20° C.). The protective colloids set forth above can be obtained by methods known to those skilled in the art, and are generally added in a total amount of from 1 to 20% by weight, based on the total weight of the monomers, in the polymerization.

If the polymerization is carried out in the presence of emulsifiers, the amount of such emulsifiers is from 1 to 5% by weight, based on the amount of monomers. Suitable emulsifiers include anionic, cationic and nonionic emulsifiers. For example, useful anionic surfactants include alkylsulfates having a chain length of from 8 to 18 carbon atoms, alkyl ether sulfates or alkylaryl ether sulfates having from 8 to 18 carbon atoms in the hydrophobic radical and up to 40 ethylene oxide or propylene oxide units, alkylsulfonates or alkylarylsulfonates having from 8 to 18 carbon atoms, esters and monoesters of sulfosuccinic acid with monohydric alcohols or alkylphenols, or nonionic surfactants such as alkyl polyglycol ethers or alkylaryl polyglycol ethers having from 8 to 40 ethylene oxide units. The process of the invention is preferably carried out in the absence of emulsifiers.

After conclusion of the polymerization, an after-polymerization can be carried out using known methods. Generally, after-polymerization is initiated by means of a redox catalyst, in order to remove residual monomers. Volatile residual monomers can also be removed by means of distillation, preferably under reduced pressure, and if appropriate, with inert entrainer gases such as air, nitrogen or steam being passed through or over the polymerization mixture. The aqueous dispersions obtained in this way have a solids content from 30 to 75% by weight, preferably from 50 to 60% by weight.

If the polymerization has been carried out in the presence of other protective colloids, the inventive mixture of polyvinyl alcohol a) and b) is added before drying.

When desired, the aqueous dispersions are dried, after addition of protective colloids as drying aid to produce the water-redispersible polymer powders. Examples of such drying include fluidized-bed drying, freeze drying or spray drying. The dispersions are preferably spray dried. Spray drying is carried out in standard spray drying units, with atomization accomplished by means of single-fluid, two-fluid or multi-fluid nozzles or by means of a rotating disc. The outlet temperature is generally in the range from 45° C. to 120° C., depending on the unit, Tg of the resin, and the desired degree of drying. More preferably, the outlet temperature is in the range from 60° C. to 90° C. In general, the drying aid, which is also a protective colloid, is used in a total amount of from 3 to 30% by weight, based on the polymeric constituents of the dispersion. This means that the total amount of protective colloid prior to the drying step should be from 3 to 30% by weight, based on the polymer in the dispersion. Preferably, the total amount of protective colloid prior to the drying step is from 5 to 20% by weight, based on the polymer in the dispersion.

If the polymerization has been carried out using the inventive polyvinyl alcohol mixture of a) and b), other protective colloids can, if appropriate, be used as drying aids. Suitable other drying aids include partially hydrolyzed polyvinyl alcohols; polyvinylpyrrolidones; polysaccharides in water-soluble form, e.g., starches (amylose and amylopectin), celluloses and their carboxymethyl, methyl, hydroxyethyl, hydroxypropyl derivatives; proteins such as casein or caseinate, soy protein, gelatin; ligninsulfonates; synthetic polymers such as poly(meth)acrylic acid, copolymers of (meth)acrylates with carboxyl-functional comonomer units, poly(meth)acrylamide, polyvinylsulfonic acids and their water-soluble copolymers; melamine-formaldehyde sulfonates, naphthalene-formaldehyde sulfonates, styrene-maleic acid and vinyl ether-maleic acid copolymers. Typically, no further protective colloids other than polyvinyl alcohols are used as a drying aid, with the polyvinyl alcohols preferred as protective colloids also preferably being used as the drying aid.

In the atomization, a content of up to 1.5% by weight of antifoam, based on the base polymer, has frequently been found to be advantageous. In order to increase the ability of the powder to be stored by improving the blocking stability, the powder obtained can be admixed with an antiblocking agent or anticaking agent. This is particularly useful when the powders have a low glass transition temperature. Preferably, the antiblocking agent or anticaking agent is present in an amount of up to 30% by weight, based on the total weight of polymeric constituents. Examples of antiblocking agents include Ca carbonate and Mg carbonate, talc, gypsum, silica, kaolins, and silicates having particle sizes which are preferably in the range from 10 nm to 10 µm.

The viscosity of the feed to be atomized is set via the solids content so that the Brookfield viscosity at 20 revolutions and 23° C. is less than or equal to 500 mPas (/). Preferably, the viscosity at 20 revolutions is less than or equal to 250 mPas. The solids content of the dispersion to be atomized is at least 35%, preferably at least 40%.

To improve the properties of the dispersion powder, further additives can be added during atomization. Further constituents which are present in dispersion powder compositions in preferred embodiments are, for example, pigments, fillers, foam stabilizers, hydrophobicizing agents.

The process for preparing the dispersion powders of the invention is carried out by means of free-radical polymerization in an aqueous medium and subsequent drying of the dispersion obtained in this way. The protective colloid used according to the invention is added during the polymerization and/or before drying of the aqueous dispersion.

The water-redispersible dispersion powders of the invention which are stabilized by protective colloids can be used in the usual fields for such material. For example, these powders may be used in building chemical products, in combination with hydraulically setting binders, cements (e.g., portland cement, alumina cement, pozzolanic cement, slag cement, magnesia cement, and phosphate cement), gypsum plaster and water glass, for the production of building adhesives. Specific examples of such products include tile adhesives and thermal insulation adhesives, plasters and renders, knifing fillers, flooring compositions, self-leveling screeds, sealing slurries, jointing mortars and paints. Preferred applications are gunned mortar and gunned concrete for building and construction and for the lining of tunnel walls.

Examples

A vinyl acetate-ethylene copolymer dispersion having a Tg of −7° C. which is prepared using 6% by weight of polyvinyl alcohol having a degree of hydrolysis of 88 mol % and a Höppler viscosity of 4 mPas served as starting dispersion.

Powders

The powders are produced after addition of polyvinyl alcohol. The dispersion is then sprayed by means of a two-fluid nozzle. Air which had been pre-compressed to 4 bar serves as the atomization component. The droplets formed are concurrently dried by means of air heated to 125° C. The dried powder obtained is admixed with 10% by weight of the commercial anti-blocking agent calcium magnesium carbonate.

Powder P1 (According to the Invention)

The starting dispersion is admixed with 2% by weight of a polyvinyl alcohol having a degree of hydrolysis of 88 mol % and a Höppler viscosity of 2 mPas, with 3% by weight of a polyvinyl alcohol having a degree of hydrolysis of 88 mol % and a Höppler viscosity of 13 mPas and with 2% by weight of a polyvinyl alcohol having a degree of hydrolysis of 88 mol % and a Höppler viscosity of 4 mPas.

% by weight of polyvinyl alcohol having $\mu_1$=15.4%

$\mu_w$=5.8 mPas

Powder P2 (According to the Invention)

The starting dispersion is admixed with 5% by weight of a polyvinyl alcohol having a degree of hydrolysis of 88 mol % and a Höppler viscosity of 2 mPas, with 3% by weight of a polyvinyl alcohol having a degree of hydrolysis of 88 mol % and a Höppler viscosity of 13 mPas and with 2% by weight of a polyvinyl alcohol having a degree of hydrolysis of 88 mol % and a Höppler viscosity of 4 mPas.

% by weight of polyvinyl alcohol having $\mu_1$=31.3%

$\mu_w$=5.1 mPas

Powder C3 (Not According to the Invention)

The starting dispersion is admixed with 12% by weight of a polyvinyl alcohol having a degree of hydrolysis of 88 mol % and a Höppler viscosity of 2 mPas, with 3% by weight of a polyvinyl alcohol having a degree of hydrolysis of 88 mol % and a Höppler viscosity of 13 mPas and with 2% by weight of a polyvinyl alcohol having a degree of hydrolysis of 88 mol % and a Höppler viscosity of 4 mPas.

% by weight of polyvinyl alcohol having $\mu_1$=52.2%

$\mu_w$=4.1 mPas

Powder C4 (Not According to the Invention)

The starting dispersion is admixed with 2% by weight of a polyvinyl alcohol having a degree of hydrolysis of 88 mol % and a Höppler viscosity of 2 mPas, with 5% by weight of a polyvinyl alcohol having a degree of hydrolysis of 88 mol % and a Höppler viscosity of 13 mPas, and with 2% by weight of a polyvinyl alcohol having a degree of hydrolysis of 88 mol % and a Höppler viscosity of 4 mPas.

% by weight of polyvinyl alcohol having $\mu_1$=13.3%

$\mu_w$=6.7 mPas

Testing:

The powders obtained are examined to determine their powder properties, processing in a sealing slurry and adhesion to Styropor.

Determination of the Blocking Resistance (BR):

To determine the blocking resistance, the dispersion powder is introduced into an iron tube having a screw cap and then loaded by means of a metal punch. After loading, the tube and contents are stored at 50° C. in a drying oven for 16 hours. After cooling to room temperature, the powder is removed from the tube and the blocking resistance is determined qualitatively by crushing the powder. The blocking resistance is classified as follows:

1-3=very good blocking resistance 4-6=good blocking resistance 7-8=satisfactory blocking resistance 9-10=no blocking resistance; powder no longer free-flowing after crushing.

Determination of the Sedimentation Behavior (RA):

The sedimentation behavior of the redispersion serves as a measure of the redispersibility of the powder. The redispersions are produced in a strength of 50% in water by application of strong shear forces. The sedimentation behavior is then determined on dilute redispersions (solids content: 0.5%). For this purpose, 100 ml of this dispersion are placed in a graduated tube and the height of sedimented solid is measured. The result is reported in mm of sediment after 24 hours. Values of greater than 7 indicate unsatisfactory redispersion of the powder.

Determination of the Adhesive Pull Strengths (AS) on Styropor of a Cement-Containing Adhesive Modified with the Redispersion Powders:

The adhesive pull strengths on Styropor (in % pull-out) are tested in the following formulation (3% polymer content):

| | |
|---|---|
| Silica sand | 665 parts |
| Portland cement | 300 parts |
| Cellulose | 5 parts |
| Redispersion powder | 30 parts |

The adhesive pull strengths are determined after the following storage conditions:

7d/21w: 7 days dry/21 days wet (wet storage)

The processing (Pr) of a cement-containing sealing slurry is determined qualitatively on the following formulation:

| | |
|---|---|
| Silica sand | 547 parts |
| Portland cement | 150 parts |
| Cellulose | 3 parts |
| Redispersion powder | 300 parts |

The results of the testing of the blocking resistance, the sedimentation behavior, the adhesive pull strength and the processing of the redispersion powders are summarized in table 1.

TABLE 1

| Example | BR | RA | AS | Pr |
|---|---|---|---|---|
| P1* | 4 | 1.9 | 80 | easy |
| P2* | 5 | 2.3 | 85 | easy, lower water requirement |
| C3 | 9 | 6.5 | 15 | not processible |
| C4 | 3 | 2.1 | 78 | viscous, difficult |

*according to the invention

It can be seen from the data in table 1 that the powder properties of the inventive products P1 and P2 are not adversely affected and the use data are improved.

What is claimed is:

1. A dispersion powder stabilized by a protective colloid, wherein the protective colloid comprises:
   a) at least one polyvinyl alcohol having a Höppler viscosity $\mu_1$ of not more than 3 mPas, the at least one polyvinyl alcohol having a Höppler viscosity $\mu_1$ of not more than 3 mPas having a degree of hydrolysis from 80 to 95% and being present in an amount from 10.0 to 50.0% by weight based on the total weight of protective colloid,
   b) at least one polyvinyl alcohol having a Höppler viscosity $\mu_2$ of from 4 mPas to 25 mPas, the at least one polyvinyl alcohol having a Höppler viscosity $\mu_2$ of from 4 mPas to 25 mPas having a degree of hydrolysis from 80 to 95% and being present in an amount from 1.0 to 5.0% by weight based on the total weight of protective colloid,
   wherein the weighted Höppler viscosity $\mu_w$ of the protective colloid is not more than 6 mPas.

2. The dispersion powder of claim 1, wherein the dispersion powder contains from 15.0 to 35.0% by weight of the at least one polyvinyl alcohol having a Höppler viscosity $\mu_2$ of from 4 mPas to 25 mPas.

3. The dispersion powder of claim 1, wherein $\mu_1$ is from 1.5 mPas to 2.5 mPas.

4. The dispersion powder of claim 1, wherein the dispersion powder contains from 0.1 to 10.0% by weight of the at least one polyvinyl alcohol having a Höppler viscosity $\mu_1$ of not more than 3 mPas.

5. The dispersion powder of claim 1 further comprising polymers selected from the group consisting of vinyl acetate homopolymers, copolymers of vinyl acetate with ethylene, copolymers of vinyl acetate with ethylene and one or more further vinyl esters, copolymers of vinyl acetate with ethylene and acrylic esters, copolymers of vinyl acetate with ethylene and vinyl chloride, styrene-acrylic ester copolymers, and styrene-1,3-butadiene copolymers.

6. The dispersion powder of claim 5 wherein the polymers comprise a component selected from the group consisting of:
   copolymers of vinyl acetate having 1 to 40 weight % ethylene;
   copolymers of vinyl acetate having 1 to 40 weight % ethylene and 1 to 50 weight % comonomers selected from the group consisting of vinyl esters having from 1 to 12 carbon atoms in the carboxylic acid radical and vinyl esters of alpha-branched carboxylic acids having from 9 to 13 carbon;
   copolymers of vinyl acetate having 1 to 40 weight % ethylene and 1 to 60 weight % acrylic esters of unbranched or branched alcohols having from 1 to 15 carbon atoms;
   copolymers having from 30 to 75 weight % vinyl acetate, 1 to 30 weight % vinyl laurate or vinyl esters of an alpha-branched carboxylic acid having from 9 to 11 carbon atoms and 1 to 30 weight % acrylic esters of unbranched or branched alcohols having from 1 to 15 carbon atoms, and 1 to 40 weight % ethylene; and
   copolymers of vinyl acetate having 1 to 40 weight % ethylene and 1 to 60 weight % vinyl chloride.

7. The dispersion powder of claim 5 wherein the polymers comprise a component selected from the group consisting of: (meth)acrylic ester polymers.

8. A process for producing a dispersion powder stabilized by a protective colloid, the process comprising:
   1) polymerizing by free radical polymerization, a composition including the protective colloid, the protective colloid comprising:
      a) at least one polyvinyl alcohol having a Höppler viscosity $\mu_i$ of not more than 3 mPas the at least one polyvinyl alcohol having a Höppler viscosity $\mu_1$ of not more than 3 mPas having a degree of hydrolysis from 80 to 95% and being present in an amount from 10.0 to 50.0% by weight, based on the total weight of protective colloid; and b) at least one polyvinyl alcohol having a Höppler viscosity $\mu_2$ of from 4 mPas to 25 mPas the at least one polyvinyl alcohol having a Höppler viscosity $\mu_2$ of from 4 mPas to 25 mPas having a degree of hydrolysis from 80 to 95% and being present in an amount from 1.0 to 5.0% by weight, based on the total weight of protective colloid;

wherein the weighted Höppler viscosity $\mu_w$ of the protective colloid is not more than 6 mPas.

9. The process of claim 8 further comprising:

2) drying the dispersion powder.

10. The process of claim 8 wherein the protective colloid is added during polymerization and/or before drying of the aqueous dispersion.

11. The process of claim 8 further comprising forming a product composition from the water-redispersible polymer powder composition.

12. The process of claim 11 wherein the product composition further comprises a component selected from the group consisting of hydraulically setting binders, cements, gypsum plaster, water glass, and combinations thereof such that the product composition is a building chemical composition.

13. The process of claim 11 wherein the product composition is a building adhesive, a tile adhesive, a thermal insulation adhesive, a plaster, a render, a knifing filler, a flooring composition, a self-leveling screed, a sealing slurry, a jointing mortar, or a paint.

14. The process of claim 11 wherein the product composition is a gunned mortar or gunned concrete.

\* \* \* \* \*